Sept. 20, 1927.
B. ICRE
1,642,879
VEHICLE FENDER AND BRAKE
Filed Feb. 9, 1925
2 Sheets-Sheet 1
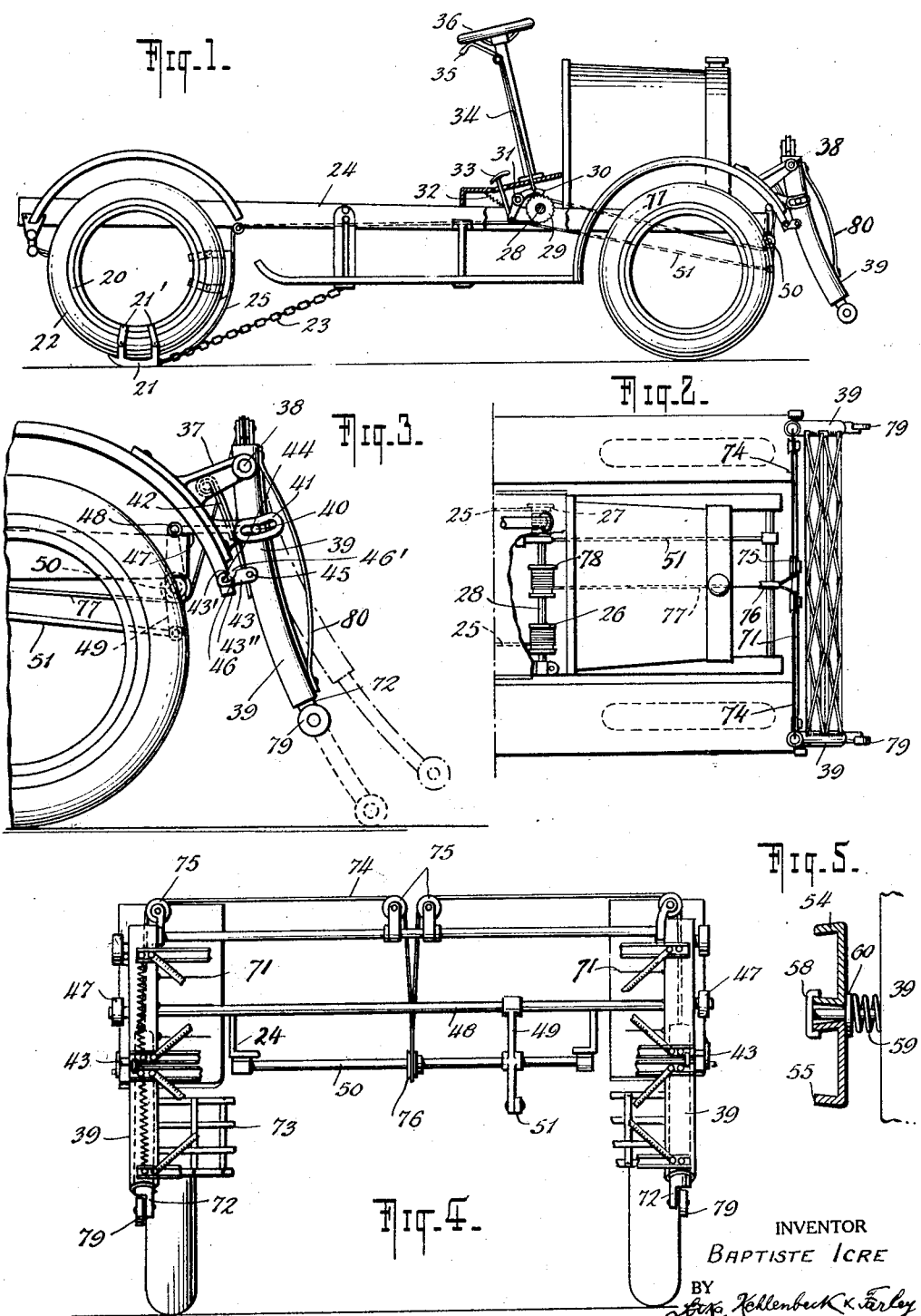
INVENTOR
BAPTISTE ICRE
BY
ATTORNEYS Sept. 20, 1927.  
B. ICRE  
1,642,879  
VEHICLE FENDER AND BRAKE  
Filed Feb. 9, 1925  
2 Sheets-Sheet 2
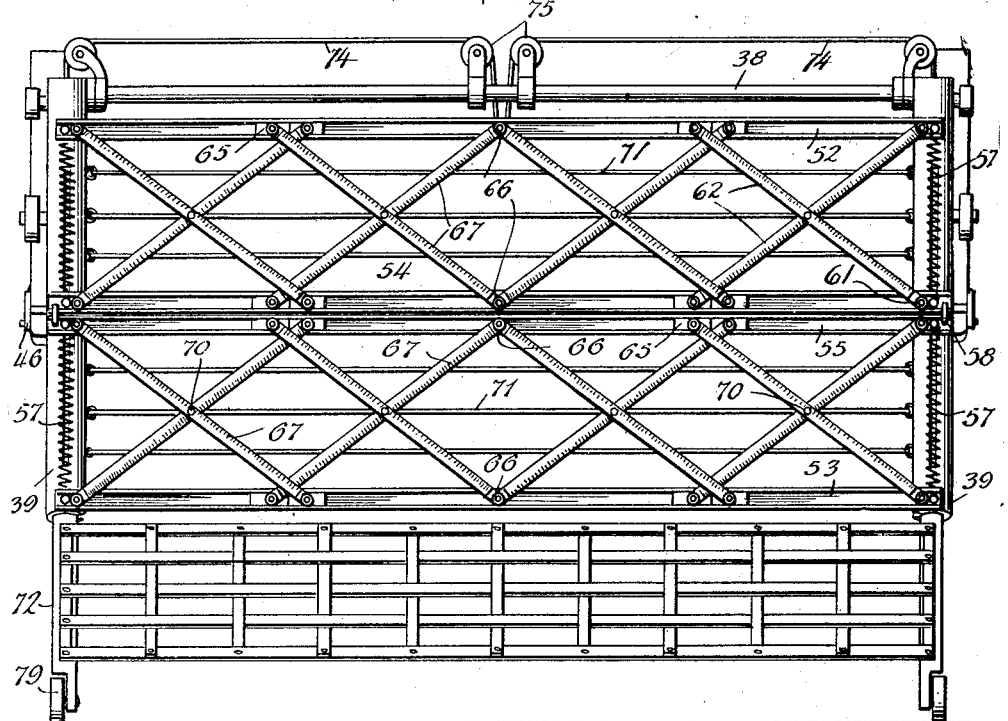
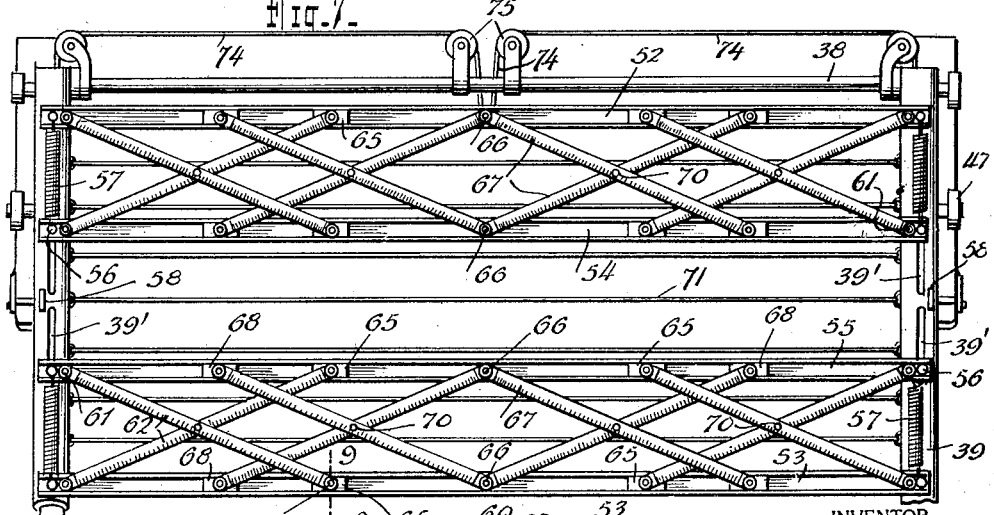
INVENTOR  
BAPTISTE ICRE  
BY  
ATTORNEYS Patented Sept. 20, 1927.

1,642,879

UNITED STATES PATENT OFFICE.

BAPTISTE ICRE, OF NEW YORK, N. Y.

VEHICLE FENDER AND BRAKE.

Application filed February 9, 1925. Serial No. 7,780.

My invention relates to fenders for vehicles and particularly for motor cars and is intended to prevent injury to persons struck by the car, also to bring about the stopping of the car in the event of its striking any obstruction.

Without desiring to restrict myself to the particular details illustrated, I will now proceed to describe a specific embodiment of my invention with reference to the accompanying drawings in which Fig. 1 is a side elevation of a motor car provided with my invention, with parts broken away, and others in section; Fig. 2 is a top view of the front part of the motor car with parts broken away; Fig. 3 is a side elevation of the forward part of the car with the fender attached thereto, drawn upon a larger scale than Fig. 1; Fig. 4 is a front elevation with parts broken away; Fig. 5 is a front elevation of a latching device, with parts in section; Fig. 6 is a front elevation of the fender in extended and lowered position; Fig. 7 is a front elevation of the fender in collapsed position; Fig. 8 is a detail view of one of the fender bars and its covering; and Fig. 9 is a detail section on line 9—9 of Fig. 7.

At 20 I have indicated the rim of a rear wheel and at 21 a brake shoe which has arms 21' guiding it along the rim 20, said brake shoe being normally raised as indicated by dotted lines in Fig. 1 but being adapted under certain conditions to drop to the operative position shown by full lines in Fig. 1, where such brake shoe becomes interposed between the ground and the tire 22. A chain 23 having its ends attached to the brake shoe and to a portion of the chassis 24 limits the rearward movement of the brake shoe. The brake shoe is normally held in its raised position by means of a wire or other flexible connection 25, the forward end of which winds on a drum 26 or 27 held to rotate with a transverse shaft 28. On this shaft is also mounted a ratchet wheel 29 normally held against rotation by means of a pawl 30, pivoted at 31, a spring 32 tending to throw the pawl into engagement with the ratchet wheel 29. The pawl may be thrown off the ratchet wheel either by pressing a pedal 33 or by a hand operated connection 34, 35 having its handle adjacent to the steering wheel 36. It will be understood that whenever the pawl 30 is thrown off the ratchet wheel 29, the weight of the brake shoes 21 will cause them to slide down to the position indicated by full lines in Fig. 1. The parts designated by the numerals 20 to 36 inclusive are substantially the same as disclosed in my application for Letters Patent of the United States Serial No. 147,293, filed February 8, 1917.

With the parts so far set forth, is arranged to co-operate a fender mechanism which I will now describe. On suitable brackets 37, here shown as connected with the front mud guards, are pivoted at 38 the side members 39 of the upper fender portion. The pivotal movement of these side members is limited by means of pins 40 on said members working in stationary guides 41, curved with 38 as a center. Springs 42 tend to press the side members 39 forward and to throw them into the position indicated by dotted lines in Fig. 3. Normally, however, the side members 39 are latched in the position indicated by full lines. For this purpose, I have provided latches 43, the slotted rear ends of which are adapted to be engaged with stationary pins 44, while their forward ends are pivoted on fulcrum pins 45 carried by the side members 39. The latches are brought to the position in which they release the side members 39, as will be explained below, by the rearward movement of the fender which occurs when the latter strikes an obstruction. For this purpose, the slots 46 of the latches are so formed that in the latched position of the fender, a hook 43' on the latch will rest on the pin 44 and thus hold the latch in this position; but if the fender swings rearwardly on the pivot 38, the open end 46' of the slot will register with the pin 44, allowing the latch to drop by gravity. Moreover, the effect of gravity is assisted by the incline or cam 43'' on the lower wall of the slot 46, which swings the latch to the free or clear position when the fender rocks rearwardly. A connection of the fender structure with the brake mechanism is effected by means of connecting rods 47 pivoted to the side members 39 at 40 and connected at their rear ends by a cross rod 48 which is pivotally connected with the upper end of a lever 49 fulcrumed on the frame at 50. The lower end of said lever is connected by a rod 51 with the lower end of the pawl 30, (see Fig. 1).

In detail the upper portion of the fender is constructed as follows: The side members 39 are connected rigidly by a horizontal top bar 52 and a similar bottom bar 53. Between these bars are arranged similar bars 54, 55, which, however, instead of being rigidly connected with the side members 39, are adapted to slide thereon vertically, being guided by pins 56, sliding in slots 39'. Springs 57 tend to pull the bar 54 upwardly toward the bar 52 and the bar 55 downwardly toward the bar 53 and thus to bring the parts into the position illustrated by Fig. 7. Normally, however, these parts are latched in the position indicated in Fig. 6. For this purpose, a latching head 58 is secured to each of the side members 39, (see particularly Fig. 5), and the adjacent edges of the channeled bars 54, 55 are normally engaged with the hook shaped ends of said head, being pressed forwardly by a spring 59, a washer 60 preferably being interposed between the forward end of the spring and the adjacent bars 54, 55. The two halves or sections of the upper portion of the fender are substantially alike and the description of one of them will therefore apply to the other as well. At the end of the bars adjacent to the side members 39, I have shown pivots 61, by which said bars are connected with diagonal bars 62 which cross each other as shown, their inner ends being connected pivotally at 63 (with the interposition of distance pieces such as, for instance, those shown at 64 in Fig. 9, so as to leave a space between the paths of these bars) with shoes 65 arranged to slide in the channels of the respective cross bars. Similarly, at the central portion of the cross bars I have shown pivots 66 by which said cross bars are connected with diagonal bars 67 likewise arranged in intersecting fashion, the outer ends of said diagonal bars 67 being connected with sliding shoes 68 of the same character as the shoes 65. Preferably, the bars 62, 67 are covered with corrugated rubber as indicated at 69. It may also be desirable to connect the bars 62, 67 pivotally at their points of intersection or overlapping, as indicated at 70, but this is not essential. The side members 39 may also be connected by cords or the like, indicated at 71, as an additional safeguard.

In the particular embodiment illustrated, the side members 39 are tubular, and within them are adapted to slide the side members 72 of the lower fender portion, these members 72 being connected by suitable cross members 73, adapted to lie in the rear of the upper fender portion, when the lower fender portion is raised, as indicated in Fig. 4. Of course the members 39 have suitable longitudinal slots so that the cross members 73 may move up or down freely. The upper ends of the members 72 are connected with wires, cords, or other flexible members 74 guided by pulleys 75, 76, the two cords 74 being preferably united into, or connected with, a single cord or wire 77 leading to a drum 78 on the shaft 28 and winding thereon in a direction opposite to the direction in which the connections 25 are wound on the drums 26, 27. It will be seen that through these instrumentalities, the pawl 30 will normally hold the lower fender portion in the raised position shown (by full lines) in Figs. 1 to 4, with the lower end of the said portion off the ground. Rollers 79 are preferably mounted at the lower ends of the side members 72.

Normally, all the parts will be in the position indicated by full lines in Figs. 1 to 4, except that the brake shoe 21 will be in the raised inactive position indicated by dotted lines in Fig. 1. Now let us suppose that the fender collides with a person or article. The effect of the impact will be to rock the fender rearward bodily upon the pivots 38. Through the linkage 47, 49, 51, this rearward movement of the fender will throw the pawl 30 off the ratchet wheel 29, and the brake 21 as well as the lower fender portion will drop to their lower active position, by the action of gravity, assisted, if desired, by suitable springs (not shown). At practically the same time, the rearward movement of the fender will throw the latches 43 to the position in which the pins 44 register with the open ends 46' of the slots 46, and these latches will swing downwardly on their pivots 45, clear of the pins 44. As soon as the force of the impact is spent, the springs 42 will throw the entire fender, with the person or article thereon, to the raised forward position indicated by dotted lines in Fig. 3. The dropping of the lower fender portion is to guard against the danger of a person's slipping under the fender, while the subsequent forward swing of the fender assists in accomplishing this result and also will throw aside any light obstacles that may have been struck by the fender.

As a person or article is struck by upper or the lower half of the upper fender portion, or both, such half or halves will be moved rearwardly to disengage it or them from the latching head 58 (Fig. 5), and as soon as released, such half or halves will be contracted, by the action of the springs 57, from the normal position shown in Fig. 6, to the closed or partly closed position shown in Fig. 7. The effect of this will be to grip the person's clothing, or any parts of the person's body that may have been thrust between the diagonal bars 62, 67. The danger of further injury to the person, by being thrown on the ground away from the fender, and perhaps into the path of another vehicle, is thus minimized.

The chauffeur, if he sees that there is imminent danger of striking a person or article, may lift the pawl 30 by means of the handle 35 or pedal 33, thus causing the brake 21 to be applied and the lower fender portion to be dropped (rear position indicated by left-hand dotted lines in Fig. 3). This action controlled by the chauffeur will not, however, disengage the latches 43, or unlatch the folding sections of the upper fender portion from the latching heads 58. The freeing of the fender for movement to the forward position indicated by the right-hand dotted lines in Fig. 3, will occur only when the fender strikes an obstruction, and the same is true as to the release of the folding sections of the upper fender portion from the latching heads 58.

I prefer to provide cushions 80 along the side members 39 of the upper fender portion, to prevent a person from being thrown off the side of the fender. As shown in Figs. 1 and 3, said cushions project forwardly beyond the collapsible structure which is located between said side members.

After the apparatus has operated as described, the parts can be reset manually in a manner that will be readily understood, and it will be noted that for this purpose the chauffeur will have to alight, turn the shaft 28 in the proper direction (by means of a suitable crank), push the fender back, and hook the latches 43 in their normal position. It will be obvious that these manipulations require sufficient time to make it impossible for a chauffeur to speed away with the car immediately after an accident.

The spacing of the crossed bars 62, 67 (by distance pieces 64 or other means) so that they will not move close to each other like the blades of scissors, is for the purpose of avoiding injury to a person which might result by pinching or crushing if these crossed bars were placed too close to each other. The soft covering 69 reduces the force of the impact, and the entire fender structure (particularly the bars 62, 67 and the cross members 73) is preferably made flexible or yielding to a sufficient degree to break or cushion the force of the blow exerted when a person is struck by the fender. Injury to the person is thus avoided as far as possible.

Various modifications may be made without departing from the nature of my invention as defined in the appended claims.

I claim:

1. In a vehicle, the combination of a fender member located at the front of the vehicle and adapted to be lowered to an active position, a brake arranged at the rear portion of the vehicle, a transverse shaft located at a point forward of the brake and rearward of the fender, drums on said shaft, flexible connections extending forwardly from the brake and rearwardly from said fender member to the respective drums on said shaft, and winding on said drums in opposite directions, and means for latching and releasing said shaft.

2. In a vehicle, a fender mounted to swing forward and rearward about an axis ranging transversely of the vehicle, means tending to throw the fender forward, and means for normally latching said fender against forward movement, in a position intermediate between the front and the rear positions of the fender, said means being adapted to release the fender for movement to its foremost position when said fender is pushed back from its intermediate latched position.

3. In a vehicle, a fender movable forward and rearward, means tending to throw the fender forward, and means for normally latching said fender against forward movement, in a position intermediate between the front and the rear positions of the fender, said means being adapted to release the fender for movement to its foremost position when said fender is pushed back from its intermediate latched position.

4. In a vehicle, a fender having parallel transverse bars capable of relative movement to increase or diminish the distance between them, diagonal bars each of which has a pivotal connection with one of said bars and a pivotal longitudinally sliding connection with the other bar, means tending to diminish the distance between said transverse bars, and a device for latching the fender in the position where such transverse bars are farthest apart, said device being arranged to release the fender when struck.

5. In a vehicle, a fender having transverse bars capable of relative movement to increase or diminish the distance between them, crossed diagonal bars connected loosely with said transverse bars and forming therewith a structure adapted to open and close as the distance between said transverse bars increases or decreases respectively, means for latching said structure in extended or open position, and means for bringing said structure to the collapsed or closed position when released from the latching means.

6. In a vehicle, a fender having transverse bars capable of relative movement to increase or diminish the distance between them, connecting bars interposed between said transverse bars and forming with them a structure adapted to open or close as the distance between said transverse bars increases or decreases respectively, a latching head for normally holding said structure in open position, yielding means for pressing said structure into operative engagement with the latching head but adapted to release said structure when it is struck, and means for bringing said structure to the collapsed or closed position when released from the latching head.

7. In a vehicle, a fender having upright side members, fixed upper and lower transverse bars connecting said side members rigidly, upper and lower transverse bars located between said fixed bars and movable up and down relatively thereto, means tending to move one of said movable bars upwardly and the other downwardly, said movable bars being also movable forward and rearward relatively to said members, latching heads secured to said side members and adapted to engage both of said movable bars, and yielding means for pressing said movable bars forward into engagement with said latching heads.

8. In a vehicle, a fender comprising an upper portion movable forward and rearward, and a lower portion connected with said upper portion so as to move forward and rearward in unison therewith, but being capable, in addition to such forward and rearward movement, of an up and down movement relatively to said upper portion, retaining means for normally holding said lower fender portion in its raised position, and means, operated by the joint rearward movement of both fender portions, for releasing said lower fender portion for downward movement relatively to the upper fender portion.

9. In a vehicle, a fender comprising an upper portion movable forward and rearward, and a lower portion connected with said upper portion so as to move forward and rearward in unison therewith, but being capable, in addition to such forward and rearward movement, of an up and down movement relatively to said upper portion, retaining means for normally holding said lower fender portion in its raised position, means, operated by the joint rearward movement of both fender portions, for releasing said lower fender portion for downward movement relatively to the upper fender portion, and additional means, under the control of the operator, for releasing said lower fender portion for downward movement relatively to the upper fender portion independently of any joint rearward movement of both fender portions.

In testimony whereof I have hereunto set my hand.

BAPTISTE ICRE.